US008260813B2

(12) United States Patent
Coldicott et al.

(10) Patent No.: US 8,260,813 B2
(45) Date of Patent: Sep. 4, 2012

(54) FLEXIBLE DATA ARCHIVAL USING A MODEL-DRIVEN APPROACH

(75) Inventors: Peter A. Coldicott, Austin, TX (US); Mei Y. Selvage, Pocatello, ID (US); Xiao Fend Tao, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 258 days.

(21) Appl. No.: 12/631,088

(22) Filed: Dec. 4, 2009

(65) Prior Publication Data

US 2011/0137869 A1 Jun. 9, 2011

(51) Int. Cl.
 *G06F 7/00* (2006.01)
(52) U.S. Cl. ........................................ 707/783
(58) Field of Classification Search .................. 707/783, 707/758, 661
 See application file for complete search history.

(56) References Cited

U.S. PATENT DOCUMENTS

| | | | |
|---|---|---|---|
| 2002/0138301 A1 | 9/2002 | Karras et al. | |
| 2003/0193994 A1 | 10/2003 | Stickler | |
| 2004/0015890 A1 | 1/2004 | Wong et al. | |
| 2004/0098729 A1 | 5/2004 | Husain et al. | |
| 2006/0009942 A1* | 1/2006 | Keck et al. | 702/122 |
| 2006/0143231 A1 | 6/2006 | Boccasam et al. | |
| 2006/0167929 A1 | 7/2006 | Chakraborty et al. | |
| 2007/0276883 A1* | 11/2007 | Kumar et al. | 707/204 |
| 2007/0283417 A1 | 12/2007 | Smolen et al. | |
| 2008/0263007 A1 | 10/2008 | Schmidt | |

FOREIGN PATENT DOCUMENTS

WO 2010068443 4/2009

OTHER PUBLICATIONS

"Reference Model for an Open Archival Information System (OAIS)", Consultative Committee for Space Data Systems, CCSDS 650.0-B-1, Blue Book, Issue 1, Jan. 2002, 148 pages.
Smith et al., "Creating Preservation-Ready Web Resources", D-Lib Magazine, ISSN 1082-9873, Jan./Feb. 2008, vol. 14, No. 12, 11 pages.
Fraternali et al., "Model-Driven Development of Web Applications: The Autoweb System", ACM Transactions on Information Systems, vol. 28, No. 4, Oct. 2000, pp. 323-382.
Chen et al., "A Semantic Web Service Based Approach for Augmented Provenance", Proceedings of the 2006 IEEE/WC/ACM International Conference on Web Intelligence.

(Continued)

*Primary Examiner* — Truong Vo
(74) *Attorney, Agent, or Firm* — William H. Steinberg; Ronald A. D'Alessandro; Keohane & D'Alessandro PLLC

(57) ABSTRACT

The present invention provides a system and methods for flexible data archival using a model-driven approach. The data archive system and method of the present invention provides the operation of moving data from original data repository into archive data repository. Users can specify archive conditions describing which portions of the data will be moved. The method may have steps such as analyzing application content, defining an archive model, transforming the model by generating an archive specification based upon the modeling result and building an application based upon the archive model and deploying the new model and archive application.

19 Claims, 6 Drawing Sheets

OTHER PUBLICATIONS

Yusuf et al., "Implement model-driven development to increase the business value of your IT system", Jan. 24, 2006, http://www.ibm.com/developerworks/library/ar-mdd1/.

Lawson, "DB2 Data—Test Data Generation and Archiving: Two Underappreciated Arts", ftpftp://ftp.software.ibm.com/software/data/db2imstools/whitepapers/lawson-testarchiving-reoprt.pdf.

International Search Report and Written Opinion for International Application No. PCT/EP2010/068443 dated Mar. 21, 2011.

Final Office Action dated Feb. 8, 2012 for U.S. Appl. No. 12/630,997 filed on Dec. 4, 2009.

Final Office Action dated Oct. 19, 2011 for U.S. Appl. No. 12/631,014 filed on Dec. 4, 2009.

* cited by examiner

FLEXIBLE DATA ARCHIVAL USING A MODEL-DRIVEN APPROACH

FIELD OF THE INVENTION

The present invention relates to a method or system of data archival using a model-driven approach. The present invention provides a flexible, generic data archiving solution using a model-driven approach. It defines a meta-model for the system.

BACKGROUND OF THE INVENTION

Many enterprises are suffering from a data explosion problem. Data grows at an exponential rate each year, largely caused by the mixture of active, inactive and unusable data. A growing number of government regulations mandate enterprises keep business critical data for a certain timeframe. For instance, the Sarbanes-Oxley Act, the Health Insurance Portability and Accountability Act (HIPAA) and Basel II (the second of the Basel Accords) all mandate enterprises keep business critical data for a certain timeframe. Statistics show the percentage of inactive data and unusable data increases nonlinearly in an operational environment. This problem leads to following major issues:
1. data explosion;
2. application performance degradation; and
3. increase in information technology (IT) costs, e.g., maintenance costs, hardware and storage costs, etc.

Data archiving is a practical approach for selecting inactive data and unusable data from an operational environment and move this data to an archive space for future use. When the inactive data is not needed anymore, it can be removed from the archive space. This is known as data purge. Thus, not only performance of enterprise application can be enhanced, but also costs can be reduced and saved. Aside from a "doing-nothing" approach, which creates performance degradation and increasing IT costs, there are three major data archive solutions adopted today.

The first is to do the data archiving manually. In this case, users select, move and remove data manually. For instance, it could be database administrators that issue queries using, for example, Structured Query Language (SQL), or using generic database utilities to query against relational databases and save the query result as files, and then transfer the files to another location using, as an example, File Transfer Protocol (FTP) which is a standard network protocol used to exchange and manipulate files over a TCP/IP based network, such as the Internet. This solution may seem to be simple and doesn't create large, upfront costs, but the disadvantage is that it creates high risk and frequently leads to data integrity issues, so this method is of potential damage to an enterprise and even may result in disaster.

The second is for applications to have their own specific "data archive" function, provided with sufficient planning and funding. This solution has following drawbacks.

The first drawback is that when an application needs to be rewritten, the data archive function or component also needs to rewritten due to tight-coupling architectures.

The second drawback is that it prolongs the project development lifecycle because the user has to do additional archive function development, such as analysis, design, implementation, and testing.

The third drawback is that there is additional cost; every project has to add resources on the implementation of the archive function.

Another drawback is that the data archive function is highly specialized for particular types of data and generic enough to satisfy changing data archive requirements for different applications.

A third major data archive solution is to use an off-the-shelf data archive product. Many software companies have offered their own data archive products. For example, International Business Machines Corporation (IBM), Hewlett-Packard Company (HP), Oracle Corporation, SAP AG and other corporations have developed data archive products. These data archive products generally may provide a configurable console and programmable tool for data archive.

However, these current products also have limitations. One such limitation is that there is limited data source and location support. Most of these tools only support specific relational databases (such as IBM® DB2®, the Oracle Database (commonly referred to as Oracle RDBMS or simply Oracle), etc) and merely archive to tables or flat files.

Another limitation is that there is limited data type support. Most present data archive products support only common data types in a relational database.

In addition, some archive tools simply copy the documents (files) just like a backup, never considering business logic.

Finally, present archive tools are not flexible enough to change archive rules. Though some archive tools integrate a larger scale of archive rules from which users can select, these rules are hard-coded in the system and difficult to change.

The above issues and drawbacks limit these solutions general usage. As is known, in an enterprise environment, there is not only data stored in databases, but also data stored in files, documents, emails and XML (Extensible Markup Language).

Also, it has only a few basic, coarse-grained and fixed archive rules, e.g. what storage pool target, what if file is in use and how long to keep. Therefore, there is a need to solve the problems associated as described above.

SUMMARY OF THE INVENTION

The present invention provides a system and methods for data archiving. The present invention provides a flexible, generic data archiving solution using a model-driven approach. It defines a meta-model for the system.

The data archive of the present invention is the operation of moving data from an original data repository into an archive data repository. Users can specify archive conditions describing which portions of the data will be moved. If the condition is null, i.e., the user does not specify any condition while archiving data, then the data will be completely removed to the archive repository. If the condition is not null, the data that does not satisfy the archive condition will stay in the original data repository.

Further, the present invention provides a method for flexible data archival using a model-driven approach in a system having real context and further having an application having content, the method may have the steps of analyzing the application content, defining and modeling archive data, creating a first data archive specification model, transforming the first data archive specification model, generating a second data archive specification model, constructing an archive application based on the second data archive specification model and real context, and deploying the second data archive specification model and creating a data archive.

Further, the present invention provides a computer system for flexible data archival using a model-driven approach, the system having real context and further having a CPU, a computer readable memory and a computer readable storage media, an application having content, the computer system may have an analyzer for analyzing the application content may have program instructions to analyze the application content, a defining and modeling component for defining and modeling archive data and for creating a first data archive specification model that may have program instructions to a defining and modeling component for defining and modeling archive data and for creating a first data archive specification model, a transformer for transforming the first data archive specification model and for generating a second data archive specification model that may have program instructions to transform the first data archive specification model and to generate a second data archive specification model, a data archive specification component having a deploying component for deploying the model and creating a data archive that may have program instructions to deploy the model and to create a data archive, and an archive application component for constructing an archive application based on the second data archive specification model and real context that may have program instructions to construct an archive application based on the second data archive specification model and real context, wherein the program instructions are stored on the computer readable storage media for execution by the CPU via the computer readable memory.

Further, the present invention provides a graphical data archive meta-model for flexible data archival that may have an archive element for archiving and purging data, a scheduling element for indicating when to start execution of an archive procedure, an object element for indicating what is to be archived, and an archive condition element for identifying what to archive and how much to archive.

Further, the present invention provides a computer program product embodied in a computer readable medium for operating in a system comprising a processing unit, a memory, a bus, input/output (I/O) interfaces, an application, the computer program product for implementing a method in a system having real context and further having an application having content for flexible data archival using a model-driven approach, the method which may have the steps of analyzing the application content, defining and modeling archive data, creating a first data archive specification model, transforming the first data archive specification model, generating a second data archive specification model, constructing an archive application based on the second data archive specification model and real context, and deploying the second data archive specification model and creating a data archive.

Further, the present invention provides a method for deploying a computing infrastructure comprising integrating computer-readable code into a computing system, wherein the code in combination with the computing system is capable of performing a process for flexible data archival using a model-driven approach in a system having real context and further having an application having content, the process may have such steps as analyzing the application content, defining and modeling archive data, creating a first data archive specification model, transforming the first data archive specification model, generating a second data archive specification model, constructing an archive application based on the second data archive specification model and real context, and deploying the second data archive specification model and creating a data archive.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention.

DETAILED DESCRIPTION OF THE INVENTION

The present invention comprises a system and method for archiving data. The system and method of the present invention consider data archiving on enterprise business objects level, not on database records, tables and files level. Data archiving is business-oriented and different enterprise applications have different data archive rules. It is very important to have a flexible, generic end-to-end data archive solution that is business-oriented, independent from individual applications, databases and systems.

Figure 1:
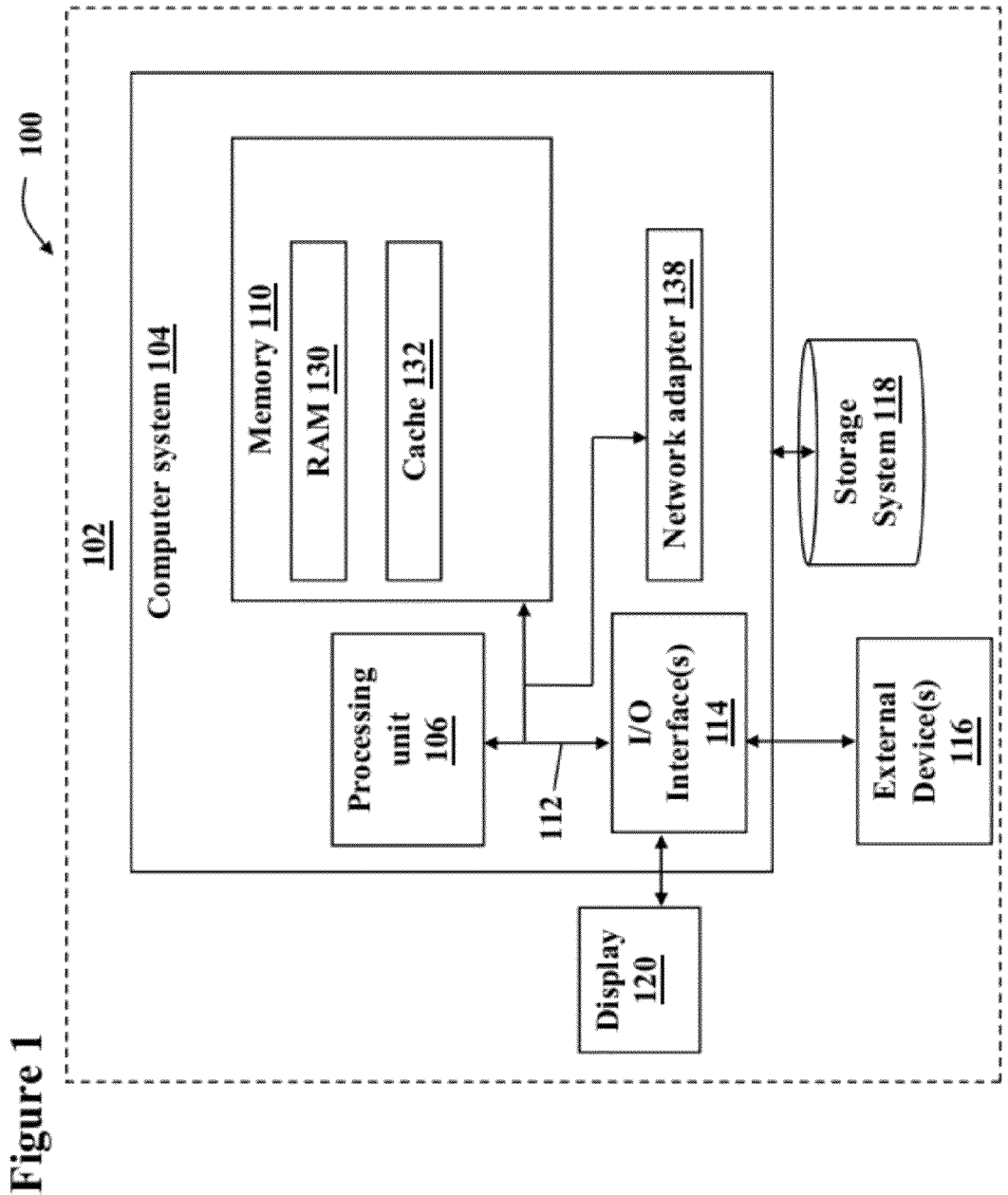
FIG. 1 shows a data processing system suitable for implementing an embodiment of the present invention.

FIG. 1 shows a system 100 that may have a data processing system 102 suitable for implementing an embodiment of the present invention. Data processing system 102 may have a computer system 104 connected to a display 120, external device(s) 116 and or other peripheral devices for providing a user an interface to computer system 104 being connected via I/O interface(s) 114. Computer system 104 may have an internal bus 112 for providing internal communication between such modules as processing unit 106, I/O interface(s) 114, network adapter 138 and memory 110. Memory 110 may have random access memory (RAM) 130, and cache 132. A storage system 118 or other forms of memory can be connected to computer system 104. RAM may take the form of integrated circuits that allow stored data to be accessed in any order (i.e., at random). Storage system 118 may take the form of tapes, magnetic discs and optical discs and are generally used for long term storage of data. Cache 132 is a memory for storing a collection of data—duplicating original values stored elsewhere or computed earlier, where the original data is expensive to fetch (owing to longer access time) or to compute, compared to the cost of reading the cache. In other words, a cache is a temporary storage area where frequently accessed data can be stored for rapid access. Once the data is stored in the cache, it can be used in the future by accessing the cached copy rather than re-fetching or re-computing the original data. A cache has proven to be extremely effective in many areas of computing because access patterns in typical computer applications have locality of reference.

Figure 2:
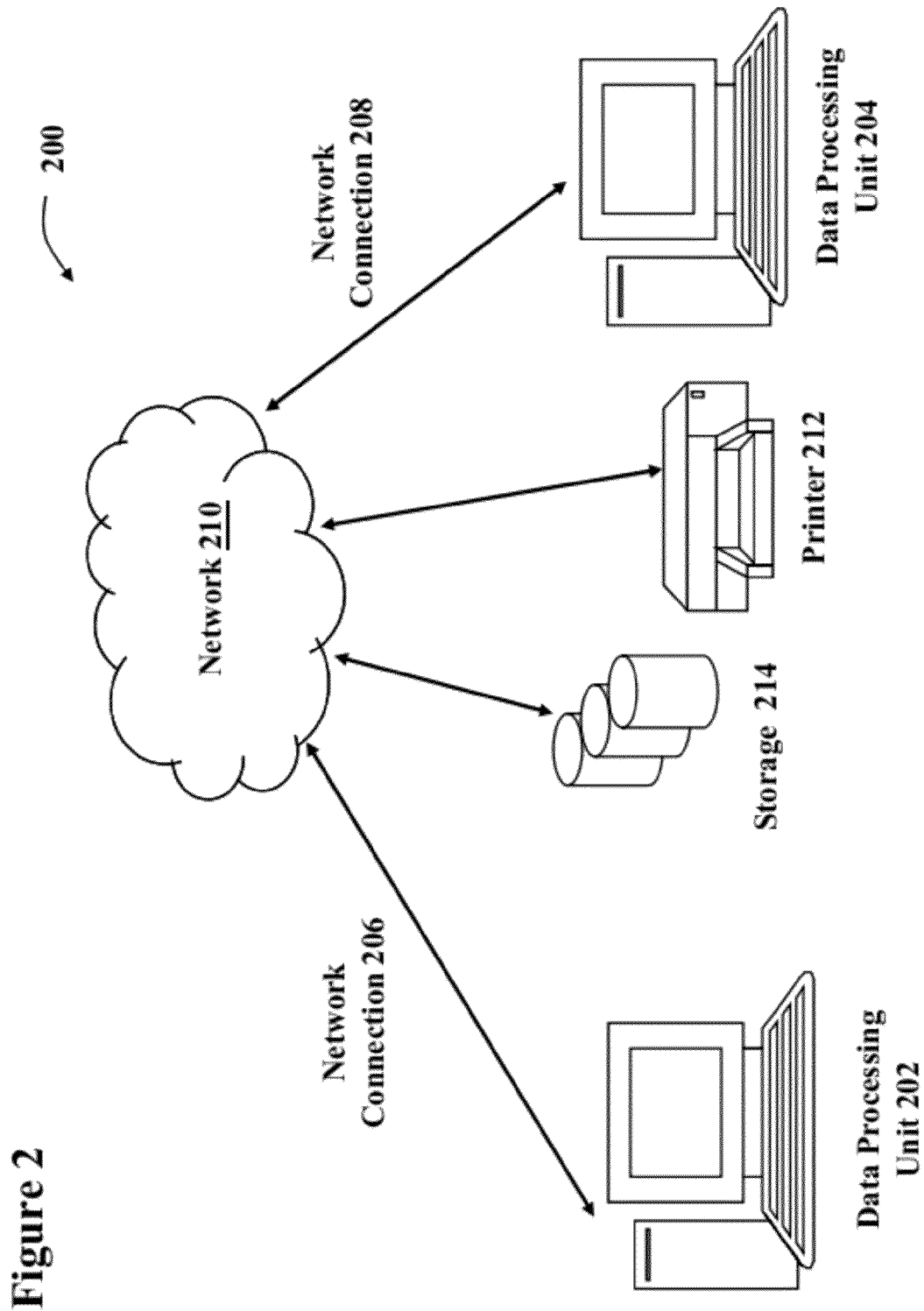
FIG. 2 shows a network for implementing an embodiment of the present invention.

FIG. 2 shows a network system 200 for implementing an embodiment of the present invention. Network system 200 may have a network 210 or group of interconnected computers, such as data processing units 202, 204, via network connections 206, 208 and may be of the type, e.g., a local area network (LAN) or internetwork. Printer 212 and storage 214 may be connected to network 210 via network connections 216, 218. Basic network components may include network interface cards, repeaters, hubs, bridges, switches and routers. Data processing units 202, 204 may be computers such as web servers or personal computers, or other user agents. A web server generally has hardware and software that are responsible for accepting HTTP requests from clients (user agents such as web browsers), and serving them HTTP responses along with optional data contents, which usually are web pages such as HTML documents and linked objects (images, etc.). In this document, the term "web browser" is used but any application for retrieving, presenting, and traversing information resources on the Internet must be considered.

There are four major steps to use the flexible, generic data archive solution of the present invention.

The first is to analyze the application content. By analyzing the application content, one may identify data archive requirements and capture information related to data types, relationships and archive rules.

The second is to define and model archive data. By defining and archiving data, one may define data archive models based on a meta-model provided in the present invention and model the data archive based on graphical modeling tools, e.g., Eclipse-based tools. Eclipse is a multi-language software development environment comprising an integrated development environment (IDE) and a plug-in system to extend it. "Meta-modeling" is the construction of a collection of "concepts" (things, terms, etc.) within a certain domain. A model is an abstraction of phenomena in the real world; a meta-model is yet another abstraction, highlighting properties of the model itself.

After the completion of the second step, a data archive specification model in UML may be created. Unified Modeling Language (UML) is a standardized general-purpose modeling language in the field of software engineering. Using the present invention, one may specify and model different perspectives of a set of archive data in an enterprise application, such as the following:

what is to be archived, for example, data, data types, relationships, data filtering conditions; and when and how to archive, that is, archive rules.

The third is to perform a model transformation and generating an archive specification (such as XML-based) and construct an archive application based on the archive specification and real context.

The fourth is to deploy the models and test the archive application. Optionally, the method and system of the present invention may optimize the archive model by observing the archive result and feeding back to the archive model optimization.

The system and method of the present invention has many advantages. It provides a business advantage by improving performance of operational applications, saving administration cost, hardware and storage cost. It provides a fast response to archive requirements and mitigates risks for regulatory compliance. It decreases time-to-market by shortening the project lifecycle. It may increase competency in data management market by leveraging corresponding data archive products and may increase revenue from the data market by leveraging corresponding data archive products. It may provide a technical advantage as it is flexible, because the solution is based on a model driven development method, and provides a good user experience because graphical modeling tools are available.

The model-driven method and system of the present invention allows a user to give more focus on archive requirements and rules, instead of construction of a specified archive application. It may be open standard-based (such as an XML-based archive specification), that can support more existing archive tools. An XML-based archive specification may be considered as canonical data model for archive.

The model-driven method and system of the present invention provides a generic data archive solution, not only limited to specified data and specified data storage/management systems wherein data archive solutions can work independently, or with existing enterprise archive solutions, such as IBM® DB2® Archive Expert or SAP AG's SAP Archive Tool.

One method of the present invention performs the following steps:

1. analyzing a data archive context of an enterprise application;
2. defining a data archive specification model;
3. performing transformations from data archive model-based specifications to XML-based specifications; and
4. deploying the data archive model and performing data archive.

Once the transformation is finished, the native archive code/rules/specifications will be deployed into corresponding archive engines. Then, a new data archive application may start to run. The core of the data archive solution in the present invention lies in a flexible, extensible meta-model component. All necessary metadata information for a data archive definition contains in the data archive meta-model.

Figure 3:
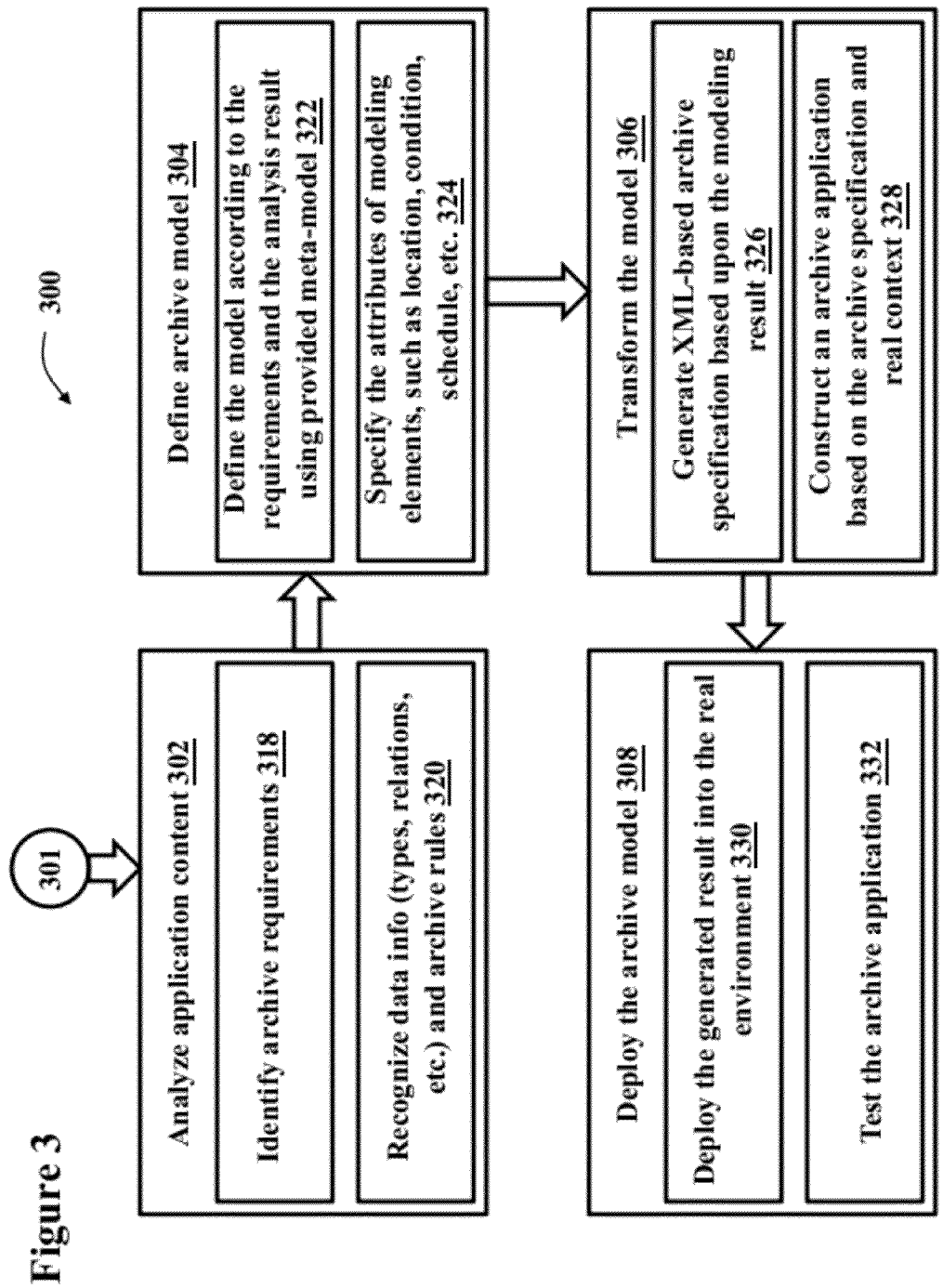
FIG. 3 illustrates an embodiment of a method of the present invention.

FIG. 3 illustrates one embodiment of the method and computer system 300 of the present invention in a computer system having a CPU, a computer readable memory and a computer readable storage media where the application context is analyzed that may have program instructions to analyze the application content at 302, the archive model is defined that may have program instructions to a defining and modeling component for defining and modeling archive data and for creating a first data archive specification model at 304, the model is transformed possibly by program instructions to transform the first data archive specification model and to generate a second data archive specification model at 306, and the model is deployed at 308 that may utilize program instructions to deploy the model and to create a data archive. The computer system may utilize program instructions to construct an archive application based on the second data archive specification model and real context, wherein the program instructions are stored on the computer readable storage media for execution by the CPU via the computer readable memory. The computer system may further have program instructions to test the data archive. The analyze application context step 302 identifies data archive requirements at identify data archive requirements 318 and recognizes data information (types, relations, etc.) and the archive rules at recognize data info and archive rules step 320. Define archive model step 304 defines the model according to the requirements and the analysis result using a provided meta-model at 322 and specifies the attributes of modeling elements, such as location, condition, schedule, etc. at 324. Model transformation step 306 generates XML-based archive specification based on the modeling result at 326 and constructs an archive application based on the archive specification and real context 328. Deploy the model step 308 deploys the generated result into the real environment at 330 and tests the archive application at 332.

Figure 4:
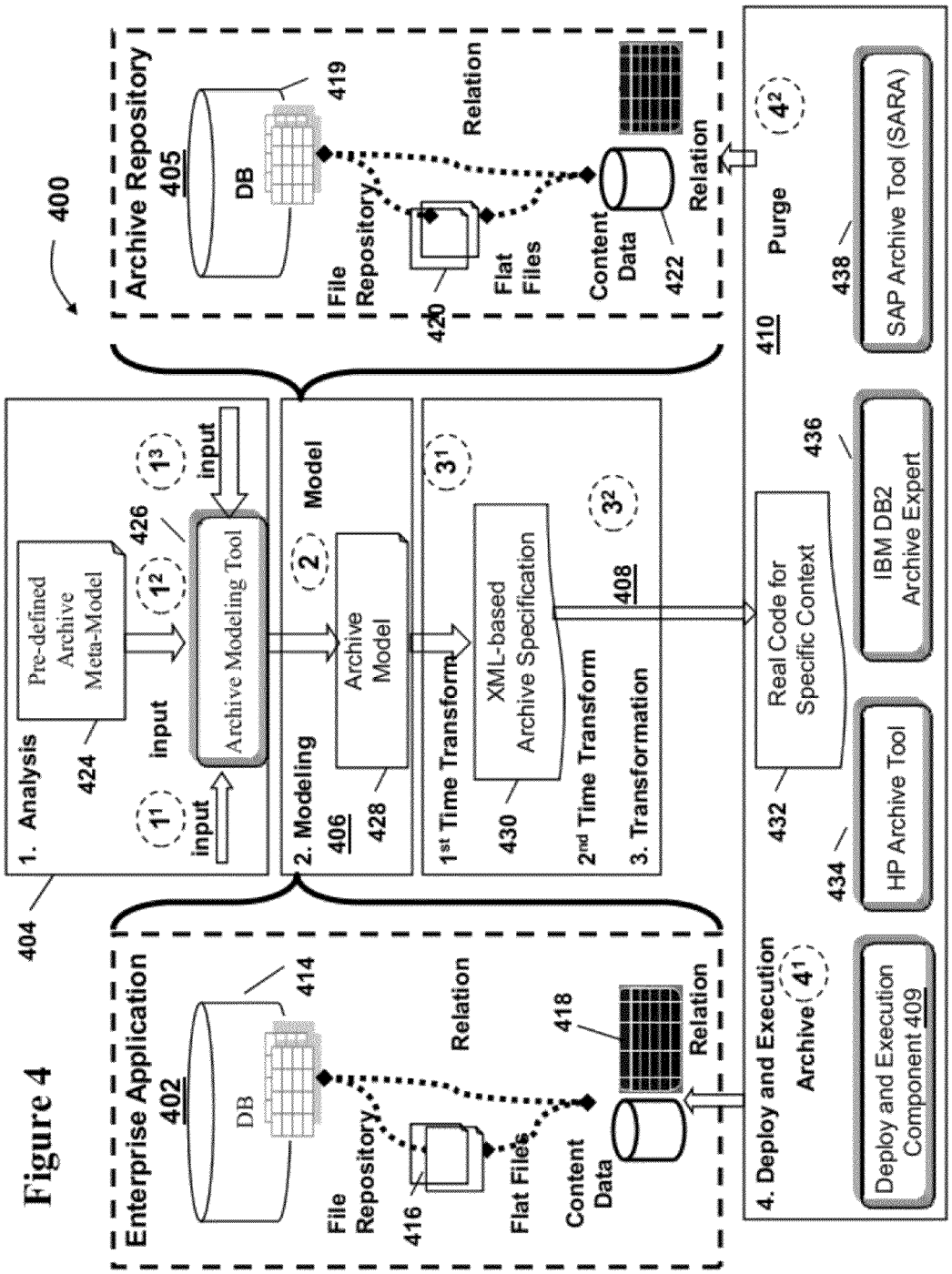
FIG. 4 illustrates an embodiment of a system and method of the present invention.

FIG. 4 shows an exemplary system and method 400 of the present invention having a model-driven approach to generate a data archive application having an enterprise application 402, an analysis component 404, a modeling component 406, a transformation component 408, an archive repository 405, and a deploy and execution component 410. Enterprise application 402 could use a relational database 414, file repository 416 and a content repository that stores XML content 418. Analysis component 404 has a pre-defined archive meta-model 424 and an archive modeling tool 426. Modeling component 406 has an archive model component 428. Transformation component 408 has an XML-based archive specification 430. Archive repository 405 could use a relational database 419, file repository 420 and a content repository that stores XML 422. Deploy and execution component 409 has deploy and execution archive infrastructure 410 that has an archive feature $4^1$, a purge feature $4^2$, an IBM DB2 archive expert 436, a SAP archive tool (SARA) 438 and HP archive tool 434.

Figure 5:
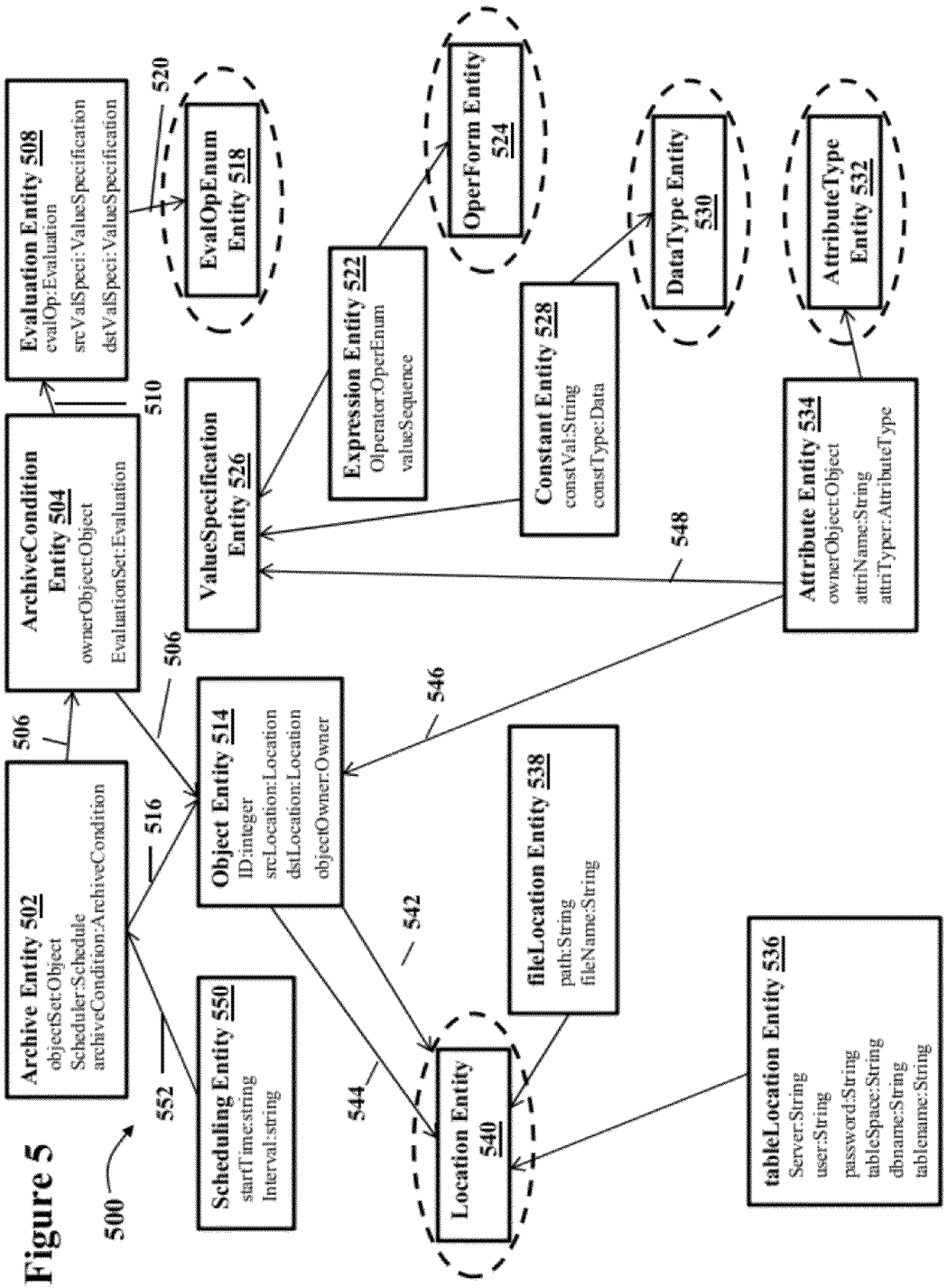
FIG. 5 illustrates a meta-model diagram of the present invention.

FIG. 5 illustrates an embodiment of a data archive solution meta-model 500 of the present invention. Data archive solution meta-model 500 may have a scheduling element 550 having numerous components such as startTime:string and interval:string. Scheduling element 550 may be connected to an Archive element 502 via connection 552 for conveying a scheduler component. Archive element 502 may have numerous components such as objectSet:Object, scheduler:Schedule, archiveCondition:ArchiveCondition and purge:Boolean. Archive element 502 may be connected via connection 506 to an ArchiveCondition element 504 for conveying archiveCondition and to Object element 514 for conveying objectSet via connection 516. ArchiveCondition element 504 may have components such as ownerObject:Object and EvaluationSet:Evaluation. ArchiveCondition element 504 may be connected to Evaluation element 508 for conveying evaluation component and to Object element 514 for conveying ownerObject component via connection 512. Evaluation element 508 may have components such as evalOp:Evaluation, srcValSpeci:ValueSpecification and dstValSpeci:ValueSpecification. Evaluation element 508 may be connected to Variability Point element 518 via connection 520 for conveying evalOp component and for storing as EvaluOpEnum component in Variability Point element 518.

Object element 514 having components such as ID:Integer, srcLocation:Location, dstLocation:Location, and ownerObject:Object may be connected to Variability Point element 540 for conveying srcConveying component and storing as Location in Variability Point element 540. Variability Point element 540 may be connected to fileLocation element 538 which may have components Path:String component and FileName:String component for receiving data from fileLocation element 538. Variability Point element 540 may further be connected to tableLocation element 536 having numerous components such as Server:String, user:String, password:String, tableSpace:string, dbname:String and tablename:String.

Object element 514 may be connected to Attribute element 534 for conveying ownerObject component via connection 546. Attribute element 534 may have components such as ownerObject:Object, attriName:String and attriType:Attribute and may be connected to ValueSpecification element 526 via connection 548. ValueSpecification element 526 may also be connected to Constant element 528 having such components as constVal:string and constType:data via connection 548. ValueSpecification element 526 may also be connected to an Expression element 522 which may have components Operator:OperEnum and valueSequence. Expression element 522 may be further be connected to variability point 524 for conveying an operator component and stored as OperEnum. Another variability point 530 includes DataType.

Some major elements in this meta-model are:
an archive element 502 representing the whole archive processing procedure. If the purge property (component) is set as true, this element represents a purge operation. Otherwise, it represents an archive operation. Following are some parameters (components) of the archive element:
objectSet: all the objects need to be archived in this archive process;
scheduler: schedule of this archive process;
archiveCondition: all the conditions for the objects in this archive process; and
purge: a Boolean value that indicates whether the archive element is in an archive operation or a purge operation.
a scheduling element 550 indicates when to start the execution of the whole archive procedure. Following are some parameters of the scheduling element:
startTime identifies when to start the execution of an archive process; and
interval describes the interval between two executions. For example, after the first execution, the second one will start to run after waiting for the time indicated by "interval".
an object element 514 indicates what is to be archived. Object element 514 can be basically classified as either of two types: a file (directory included) and a table. Objects can be constrained by other objects when being archived. Each object has a unique identification (ID) in the archive process scope. In the corresponding archive process, objects can be accessed by its ID. Type of ID is Uniform Resource Identifier (URI). A URI consists of a string of characters used to identify or name a resource on the Internet.
srcLocation: Specification of the source data repository.
dstLocation: Specification of the archive data repository.
ArchiveCondition: ArchiveCondition element demonstrates what is to be archived and how much to archive. Data from Object element will not be archived if the object does not satisfy the conditions indicated in ArchiveCondition. Sometimes although the object satisfies the condition, not all data in it can be archived. Only the portion of data that satisfies conditions specified in the ArchiveCondition can be archived in the end.
Evaluation: One evaluation corresponds to one independent archive condition for a particular archive object.
ValueSpecification
Expression: Operator is applied to the sequential operands. Operands can be any ValueSpecification entities: Attribute, Constant or Expression.
"Attribute" is to describe attribute names and types of archived data.
"Location" is to model the data source and archive repository and model where to perform data archive.

Since there are various data, data type and data repository and management systems, the data archive meta-model of the present invention provides flexibility and extendibility by providing variability points. These variability points are identified in dotted circles in FIG. 5.
Variability point "Location" 540: For heterogeneous data archive repositories, one may easily introduce a new type of location inherited from "Location" element. The examples in FIG. 5 show file and relational database table locations, but the user could extend the location to IMS segment or XML repository locations. IBM Information Management System (IMS) is a joint hierarchical database and information management system with extensive transaction processing capabilities. XML (Extensible Markup Language) is a set of rules for encoding documents electronically.

"AttributeType" (Attribute 534): For metadata type, an enumeration type called AttributeType is defined. One may easily add new metadata types as new enumerations.

"DataType" (at variability point 530): For data type, an enumeration type called DataType is defined. Other new data types may be added as new enumerations.

For data archive condition, two enumeration type elements are defined (i.e., "EvaluOpEnum" at variability point 518 and "OperEnum" at expression element 522) to support the flexibility and extendibility.

The following is a simple but typical scenario to archive multi-tables and files with corresponding relationships:

1. "Analyze application content": The application is analyzed to understand which data objects need to be archived and where the destinations are.

2. "Define Archive Model": There are 3 data objects needs to be archived, i.e., such as, for instance, a table named "table1", a table named "table2", and a file named "file1". Data in table1 and table2 may be relational data. One "absolution path" attribute of file1 associates "file1 type" file with the data in table2. A data archive specification model is then created.

3. "Transformation": The next step is to transform the above data archive model into XML-based specifications and generate a data archive application in real code based on specifications.

4. "Deployment": In a final step, the data archive application may be deployed into corresponding archive engines (tools). Then, the data archive application rolls out and serves the real enterprise application.

Figure 6:
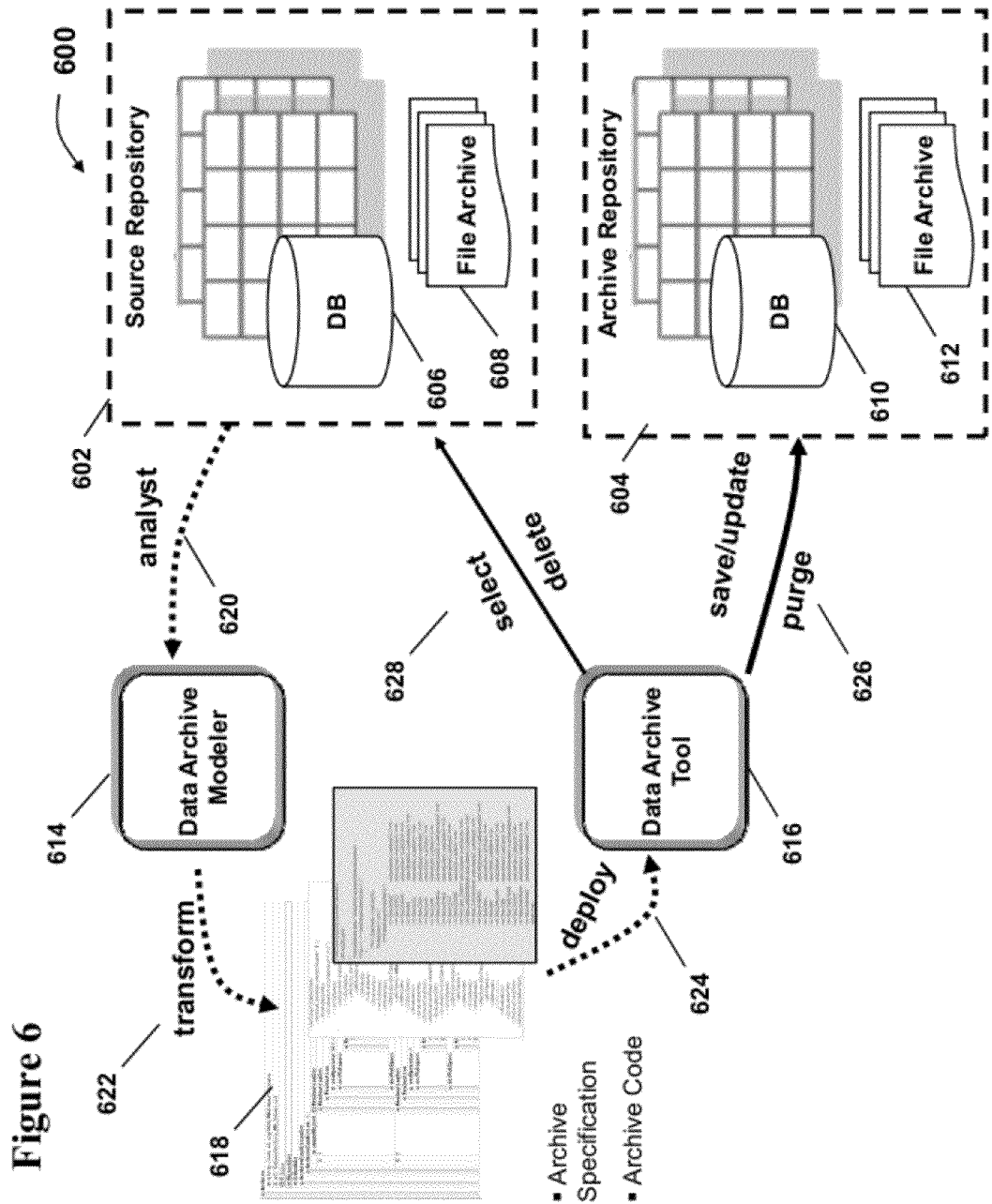
FIG. 6 illustrates another embodiment of the system and method of the present invention.

FIG. 6 shows a transformation and deployment flow in a flexible, generic data archive system 600 of the present invention. System 600 has a source repository 602 and an archive repository 604. Source repository 602 has a database DB 606 and a file archive 608 and an archive repository 604 has a database DB 610 and a file archive 612. The process includes a data archive modeler 614 and a data archive tool 616. Data archive modeler 614 assists in the analyze process by receiving an analyst signal 620 from the source repository 602. It performs the transformation process and sends a transform message 622 to an archive specification and archive code 618. It is then deployed via a deploy message 624 to the data archive tool 616. Data archive tool 616 conveys either a select or delete instruction to source repository 602. Data archive tool 616 also conveys either a save/update or a purge instruction to archive repository 604 to indicate whether the data should be saved or purged.

While shown and described herein as a system and methods of archiving data, the present invention may comprise other systems and methods. While the present invention also provides for business applications for archiving data, it is understood that the invention further provides various alternative embodiments. For example, in one embodiment, the invention provides a computer-readable/useable storage medium that includes computer program code to enable a computer infrastructure for a system to allow the archiving of data. To this extent, the computer-readable/useable storage medium includes program code that implements each of the various process steps of the invention.

It is understood that the terms computer-readable storage medium or computer useable storage medium comprises one or more of any type of physical embodiment of the program code. In particular, the computer-readable/useable storage medium can comprise program code embodied on one or more portable storage articles of manufacture (e.g., a compact disc, a magnetic disk, a tape, etc.), and/or on one or more data storage portions of a computing device, such as memory and/or storage system (e.g., a fixed disk, a read-only memory, a random access memory, a cache memory, etc.).

In another embodiment, the invention provides a computer-implemented method for archiving data. In this embodiment of the present invention, a computerized infrastructure may be provided and one or more systems may be provided for performing process steps of the invention that may be obtained and deployed to the computerized infrastructure.

A process for deployment of a system of the present invention can comprise one or more process steps of installing program code on a computing device, such as computer system from a computer-readable storage medium, adding one or more computing devices to the computer infrastructure, and incorporating and/or modifying one or more existing systems of the computer infrastructure to enable the computerized infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for flexible data archival using a model-driven approach in a system having a context and further having an application having content, the method comprising:
   a computer analyzing the application content;
   the computer creating a data archive specification model based on the application content, wherein the data archive specification model is created in a general-purpose visual modeling language, and wherein the data archive specification model is based on a meta-model comprising an archive operation schedule indicating whether archive data should be saved or purged;
   the computer transforming the data archive specification model and modeling the archive data based on graphical modeling tools;
   the computer generating a second data archive specification from the data archive specification model;
   the computer constructing an archive application based on the second data archive specification and the context; and
   the computer deploying the archive application to create a data archive.

2. The method as defined in claim 1, wherein the analyzing the application content comprises:
   the computer identifying data archive requirements; and
   the computer capturing information related to data types, relationships and archive rules.

3. The method as defined in claim 2 further comprising the computer defining the second data archive specification based upon data, data types, relationships, data filtering conditions, archive rules, and a data source and archive repository.

4. The method as defined in claim 1 further comprising the computer testing the data archive.

5. The method as defined in claim 4 further comprising:
the computer observing an archive result; and
feeding back the archive result for archive model optimization.

6. A computer system for flexible data archival using a model-driven approach, the computer system having a context and further having an application having content, the computer system comprising:
a CPU, a computer readable memory and a computer readable storage media;
program instructions, stored on the computer readable storage media for execution by the CPU via the computer readable memory, to analyze the application content;
program instructions, stored on the computer readable storage media for execution by the CPU via the computer readable memory, to create a data archive specification model based on the application content, wherein the program instructions to create the data archive specification model create the data archive specification model in a general-purpose visual modeling language, and wherein the data archive specification model is based on a meta-model comprising an archive operation schedule indicating whether archive data should be saved or purged;
program instructions, stored on the computer readable storage media for execution by the CPU via the computer readable memory, to transform the data archive specification model;
program instructions, stored on the computer readable storage media for execution by the CPU via the computer readable memory, to generate a second data archive specification;
program instructions, stored on the computer readable storage media for execution by the CPU via the computer readable memory, to deploy the second data archive specification to create a data archive; and
program instructions, stored on the computer readable storage media for execution by the CPU via the computer readable memory, to construct an archive application based on the second data archive specification the context.

7. The computer system as defined in claim 6 further comprising program instructions, stored on the computer readable storage media for execution by the CPU via the computer readable memory, to test the data archive.

8. A method for using a graphical data archive meta-model for flexible data archival, the method comprising:
a computer analyzing application content of an enterprise application;
the computer creating a data archive specification model based on the application content of the enterprise application, wherein the data archive specification model is based on the graphical data archive meta-model and is created in a general-purpose visual modeling language;
modeling archive data based on the data archive specification model using one or more graphical modeling tools, wherein the graphical data archive meta-model comprises an archive operation schedule including instructions for:
archiving and purging data;
indicating when to start execution of an archive procedure;
indicating what is to be archived; and
identifying what to archive and how much to archive; and
the computer transforming the data archive specification model to generate a second data archive specification.

9. The method as defined in claim 8, wherein the archiving and purging data comprises purging archived data when a purge property is set as true, and archiving data when the purge property is not set as true.

10. The method as defined in claim 8, wherein the indicating when to start execution of an archive procedure comprises:
identifying when to start an execution of an archive process; and
identifying an interval between two executions of an archive process.

11. The method as defined in claim 8, wherein the indicating what is to be archived comprises:
associating an object having a unique identification (ID);
classifying the object as a file or a table.

12. A computer program product embodied in a computer readable storage device for operating in a system comprising a processing unit, an application having content for flexible data archival using a model-driven approach, and a context, the computer program product comprising:
a computer readable storage medium;
program instructions, stored on the storage medium, for analyzing the application content;
program instructions, stored on the storage medium, for creating a data archive specification model based on the application content, wherein the program instructions for creating the data archive specification model create the data archive specification model in a general-purpose visual modeling language, and wherein the data archive specification model is based on a meta-model comprising an archive operation schedule indicating whether archive data should be saved or purged;
program instructions, stored on the storage medium, for transforming the data archive specification model to generate a second data archive specification model;
program instructions, stored on the storage medium, for constructing an archive application based on the second data archive specification and the context; and
program instructions, stored on the storage medium, for deploying the application to create data archive.

13. The computer program product as defined in claim 12 further comprising:
program instructions, stored on the storage medium, for identifying data archive requirements; and
program instructions, stored on the storage medium, for capturing information related to data types, relationships and archive rules.

14. The computer program product as defined in claim 13 further comprising program instructions, stored on the storage medium, for defining the second data archive specification based upon data, data types, relationships, data filtering conditions, archive rules, and a data source and archive repository.

15. A method for deploying a computing infrastructure, the method comprising a computer integrating computer-readable code into a computing system, wherein the code in combination with the computing system is capable of performing a process for flexible data archival using a model-driven approach in a system having a context and further having an application having content, the process comprising:

analyzing the application content;

creating a data archive specification model based on the application content, wherein the data archive specification model is created in a general-purpose visual modeling language and is based on a meta-model comprising an archive operation schedule indicating whether archive data should be saved or purged;

transforming the data archive specification model to generate a second data archive specification;

constructing an archive application based on the second data archive specification and the context; and deploying the archive application to create a data archive.

16. The method as defined in claim 15 wherein the process further comprises:

identifying data archive requirements; and capturing information related to data types, relationships and archive rules.

17. The method as defined in claim 16 wherein the process further comprises defining the second data archive specification based upon data, data types, relationships, data filtering conditions, archive rules, and a data source and archive repository.

18. The method as defined in claim 15 wherein the process further comprises testing the data archive.

19. The method as defined in claim 18 wherein the process further comprises:

observing an archive result; and feeding back the archive result for archive model optimization.

\* \* \* \* \*